3,052,738
Patented Sept. 4, 1962

3,052,738
METHOD OF RESISTING RADIATION DAMAGE TO ORGANIC FLUIDS AND COMPOSITIONS THEREFOR
Robert O. Bolt, San Rafael, and Beppino J. Fontana, Berkeley, Calif., assignors, by mesne assignments, to the United States of America as represented by the United States Atomic Energy Commission
No Drawing. Filed July 21, 1959, Ser. No. 828,670
5 Claims. (Cl. 260—666.5)

The present invention relates to methods and compositions employed as coolants or moderators in nuclear reactors and, more particularly, to the use of an additive for improving the radiation resistance of an organic composition employed in a radiation environment.

A variety of organic materials has been proposed for use or has been utilized as coolants and moderators in nuclear reactors. Neutronic reactors employing an organic moderator are disclosed, e.g., in U.S. Patent No. 2,708,656, issued May 17, 1955, to E. Fermi et al. The use of organic liquids as coolants is also disclosed in chapter 8 of "Principles of Nuclear Reactor Engineering," Glasstone, 1955, Van Nostrand Company, Inc. A bibliography of publications is presented in "Selected Abstracts on the Use of Organic Materials as Moderator-Coolant Reactors," G. Naish and R. W. Bowring, AERE Report Inf/Bib 105. Moreover, the feasibility of using organic fluids as coolant-moderators in nuclear reactors has been amply demonstrated by the successful operation of the organic moderated reactor experiment (OMRE). c.f. "Details of ORME, Nucleonics, vol. 14, No. 5, page 22, May 1956. Inhibited reactor coolants and methods of using the same are also disclosed in U.S. Patent No. 2,883,331, issued April 21, 1959, to Robert O. Bolt et al.

Organic moderated and cooled reactors have many advantageous features which permit economy of construction and operation. Generally speaking, aromatic hydrocarbons such as polyphenyls, aromatic condensed ring compounds, aromatic ethers and alkylated aromatic compounds are employed as coolants in such reactors. While such aromatic compounds possess an inherent degree of radiation resistance they are not totally resistant to radiolytic changes upon extended operation and therefore undergo viscosity changes, and are subject to gas evolution and in extreme cases coking with extensive decomposition. Replacement and/or purification of the coolant is therefore necessitated at regular intervals.

It has now been discovered that the addition of phenazine (azo-phenylene) substantially reduces radiolytic changes in such moderator-coolants during irradiation. Accordingly, phenazine is incorporated into an organic coolant material to provide a radiation resistant composition which is then used as a coolant, heat transfer agent or moderator in a nuclear reactor.

It is therefore an object of the invention to provide an improved organic coolant-moderator composition for use in a nuclear reactor.

Another object of the invention is to provide phenazine as an additive for improving the radiation resistance of aromatic hydrocarbon compositions.

Still another object in the invention is to employ phenazine stabilized aromatic hydrocarbon coolant-moderators in nuclear reactors.

Other objects and advantageous features of the invention will become apparent by consideration of the following specification.

In general the coolant-moderator compositions of the invention comprise phenazine incorporated into a suitable polynuclear aromatic hydrocarbon. Ordinarily the additive is employed in small amounts ranging from about 1% to about 10%, and especially in the range of about 3% to 8%. Larger amounts may be employed if desired, however amounts in the ranges indicated are satisfactory for normal operation. The indicated compositions are circulated as coolants or disposed as moderators to serve the normal functions of these materials in an organic moderated or cooled reactor. The organic compound phenazine (azo-phenylene) has the following formula:

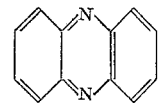

The most suitable type of polynuclear aromatic hydrocarbons for present purposes is the non-fused ring class of polyphenyls such as biphenyl, m-terphenyl, o-terphenyl and p-terphenyl which class of compounds is therefore preferred. Other suitable aromatic hydrocarbons include the various quaterphenyls and the fused ring aromatics such as naphthalene, anthracene, phenanthrene and binaphthyl. Admixtures of the foregoing may also be employed. The presence of non-aromatic substituents such as alkyl groups tends to reduce the stability of the preferred aromatic hydrocarbons and accordingly alkylated derivatives of the foregoing materials or paraffinic hydrocarbons corresponding thereto tend to reduce the stability upon neutron irradiation and at elevated temperatures. Hence for maximum radiation resistance the preferred polynuclear aromatic compositions are preferably free of significant amounts of such substituents. Moreover, the compounds are free of halogenated substituents particularly chloro- and fluoro-compounds which generate very corrosive products in a nuclear radiation environment at elevated temperatures.

Radiolytic experiments demonstrating the effectiveness of the present additive were conducted in hole E-25 of the Brookhaven graphite reactor. Ten-day exposure periods to ambient mixed reactor flux were employed with exposure temperatures as indicated. The organic compositions were placed in capsules and irradiated in electrically heated ovens which were temperature controlled from suitably placed thermocouples in the oven.

The compositions were exposed in identical 410 stainless capsules having a 22 ml. capacity. Capsules were charged with approximately 10 ml. of the organic fluid and the remaining void was filled with atmospheric pressure helium gas. The production of radiolysis gases from the organic fluid was measured by means of a special pressure gauge-expansion flask-manifold system. Samples of the gas were withdrawn from the manifold for subsequent analysis. Special details of the construction and operational aspects of the capsules, the gas measuring system and a special capsule opener have heretofore been described at pages 54–57, vol. 14, No. 8, Nucleonics, August 1956.

Viscosity change and volume of gas evolved were the two radiation damage indices used. Although these indices are somewhat empirical in that they do not indicate what is actually happening to the composition, they are nevertheless of considerable interest in engineering applications. Viscosity is easily measured and is an important property in industrial or military reactor applications. In order to equate viscosity change for a wide variety of organic substances an idealized concept of $n_1$ (or $n_{10}$) initiated in earlier work described in Industrial Engineering and Chemistry, vol. 50 (No. 2, pages 221–228), February 1958, is used. This value is the viscosity of an irradiated fluid at the temperature $T_1$ at which the viscosity of the starting material was 1 cs. Using this concept the initial viscosity of each fluid begins at 1 cs. Viscosity change from radiolysis is then measured in terms of deviation from this point.

Gas evolution from the irradiated samples is expressed in terms of moles of gas (STP) per mole of organic charged. Although the amount of gas evolved is not considered as important as the viscosity change, disposal of gas is of concern in practical operations. The composition of evolved gas is also of concern since, e.g., certain evolved gases such as hydrogen may have a serious effect upon materials of construction in the reactor.

Slow and resonance neutron fluxes were determined experimentally by irradiating cobalt-aluminum foils in both the bare and cadmium-shielded state. Fast neutron flux was obtained by measuring the activity of $Sr^{89}$ separated from irradiated $U^{238}$ and $Np^{237}$. The particular techniques employed have been described previously in the "Proceedings of the International Conference on Peaceful Uses of Atomic Energy," Geneva, 1955, vol. 7, page 550, in the paper entitled "Organics as Reactor Moderator-Coolants," by R. O. Bolt and J. G. Carroll. Further details of the method employed in the irradiations are disclosed in the aforesaid patent to Robert O. Bolt et al. and in the following example.

EXAMPLE

50%–50% mixtures of biphenyl and m-terphenyl with and without phenazine additive (5%) were irradiated as indicated above under the conditions and with the results shown in the following table.

Table I

EFFECTIVENESS OF PHENAZINE IN REDUCING POLYPHENYL RADIOLYSIS DAMAGE

| Material | Additive | Temp., °F. | Radiation Dosage [a] | Viscosity Index of Damage, $m_1$ [b] | Moles of Gas per Mole of Fluid |
|---|---|---|---|---|---|
| Biphenyl—50% m-Terphenyl—50% | None | 760 | 2.0 | 2.70 | 0.065 |
| Biphenyl—50% m-Terphenyl—50% | 5%Phenazine | 760 | 2.3 | 1.90 | 0.062 |

[a] $\times 10^{18}$ Thermal neutrons/cm.². These are the thermal neutron components of the total radiation dosages received upon irradiation in the Brookhaven reactor.
[b] $m_1$ = viscosity of the irradiated material at the temperature at which original viscosity was 1 cs. $m_1$ of 1 shows no change.

From the foregoing it will be noted that reduction of viscosity increase of 13% together with a 5% decrease in gas evolution was produced by inclusion of the additive in the indicated mixture.

While there has been described in the foregoing what may be considered to be preferred embodiments of the invention, modifications may be made therein without departing from the spirit of the invention and it is intended to include all such as fall within the scope of the appended claims.

What is claimed is:

1. A composition of improved resistance to deterioration at elevated temperatures in the presence of nuclear radiation and suitable for use as a nuclear reactor coolant-moderator, said composition consisting essentially of non-fused ring polyphenyl hydrocarbons and 1–10% by weight of phenazine.

2. The composition as defined in claim 1 wherein said polyphenyl hydrocarbons are materials selected from the group consisting of biphenyl, m-terphenyl, o-terphenyl, p-terphenyl and quaterphenyls.

3. A composition of improved resistance to deterioration at elevated temperatures in the presence of nuclear radiation and suitable for use as a nuclear reactor coolant-moderator, said composition consisting essentially of non-fused polyphenyls selected from the group consisting of biphenyl, m-terphenyl, o-terphenyl, p-terphenyl and quaterphenyls and 2–8% by weight of phenazine.

4. The method of improving the resistance of non-fused ring polyphenyl hydrocarbons to deterioration at elevated temperatures in the presence of nuclear radiation which consists of adding to said non-fused ring polyphenyl hydrocarbons, 1–10% by weight of phenazine.

5. The method of improving the resistance of non-fused ring polyphenyl aromatic hydrocarbons to deterioration at elevated temperatures in the presence of nuclear radiation which consists of adding to said non-fused ring polyphenyl hydrocarbons, 2–8% by weight of phenazine.

References Cited in the file of this patent

UNITED STATES PATENTS

| 2,757,141 | Ross et al. | July 31, 1956 |
| 2,925,448 | Colichman | Feb. 16, 1960 |